Nov. 18, 1952 A. FRANKEL ET AL 2,618,461

GAS TURBINE

Filed Feb. 14, 1949 2 SHEETS—SHEET 1

Inventors:
Adolf Frankel
Alec B. Mitchell
By Babcock & Babcock
Attorneys

Nov. 18, 1952   A. FRANKEL ET AL   2,618,461
GAS TURBINE

Filed Feb. 14, 1949   2 SHEETS—SHEET 2

INVENTORS:
ADOLPH FRANKEL
ALEC B. MITCHELL
BY Babcock & Babcock
ATTORNEYS

Patented Nov. 18, 1952

2,618,461

UNITED STATES PATENT OFFICE 2,618,461

GAS TURBINE

Adolf Frankel, Rugby, and Alec Burton Mitchell, London, England, assignors to The English Electric Company Limited, London, England, a British company Application February 14, 1949, Serial No. 76,334
In Great Britain October 5, 1948

2 Claims. (Cl. 253—39.1)

The invention relates to gas turbines and has the main object of providing a gas turbine wherein the inflow of heat from the blades, which are exposed to the main stream of combustion gases, into the stator and rotor is restricted so as to eliminate the necessity of using highly alloyed special steels for the gas turbine, except for the blades, without lowering the maximum temperature in the gas turbine operation cycle and thereby the thermal efficiency thereof.

It is a further object of the invention to provide components of the gas turbine which in themselves or in cooperation with adjacent components serve to attain the main object hereinbefore stated. Such components are, for example, the stator casing, stator blade retaining rings, stator and rotor blades, filler pieces and turbine rotors.

With these and further objects, as will appear later from the detailed description of an embodiment of the invention, in view, we completely screen the continuous portions of the stator casing and rotor body from direct contact with the hot combustion gases, and thereby reduce hoop stresses in, and prevent an increase of diameter of, these components which would affect the tip clearance of the blades.

In addition, the attachment means of the blades to the stator are exposed to streams of cooling fluid passing between them and the stator casing.

According to a subsidiary feature of the invention, the attachment means are made with a restricted heat conductive cross section, which contributes to reducing the heat inflow into the stator or rotor.

In order that the invention be better understood and readily carried into effect, an embodiment thereof will now be described by way of example and with reference to the accompanying drawings, in which.

Figure 2:
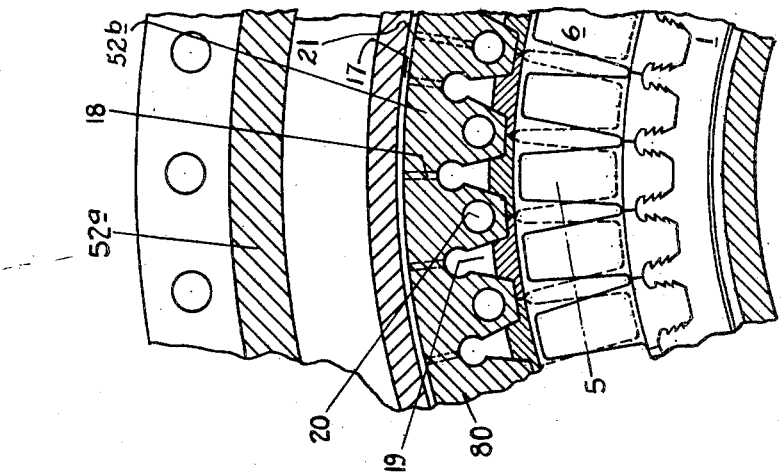
Fig. 2 is a part cross section along the line 2—2 of Fig. 1.

The gas turbine of the present embodiment comprises two mechanically independent turbine rotors 1 and 2 coaxially aligned in series flow arrangement, the rotor 1 driving the compressor (not shown) and the rotor 2 driving the power output shaft (not shown) of the gas turbine. The rotor blades 6, 8 of rotor 1 and 10, 12 of rotor 2 alternate with the stator blades 5, 7, 9, 11, combustion gas under pressure arriving by the entrance 4.

Figure 1:
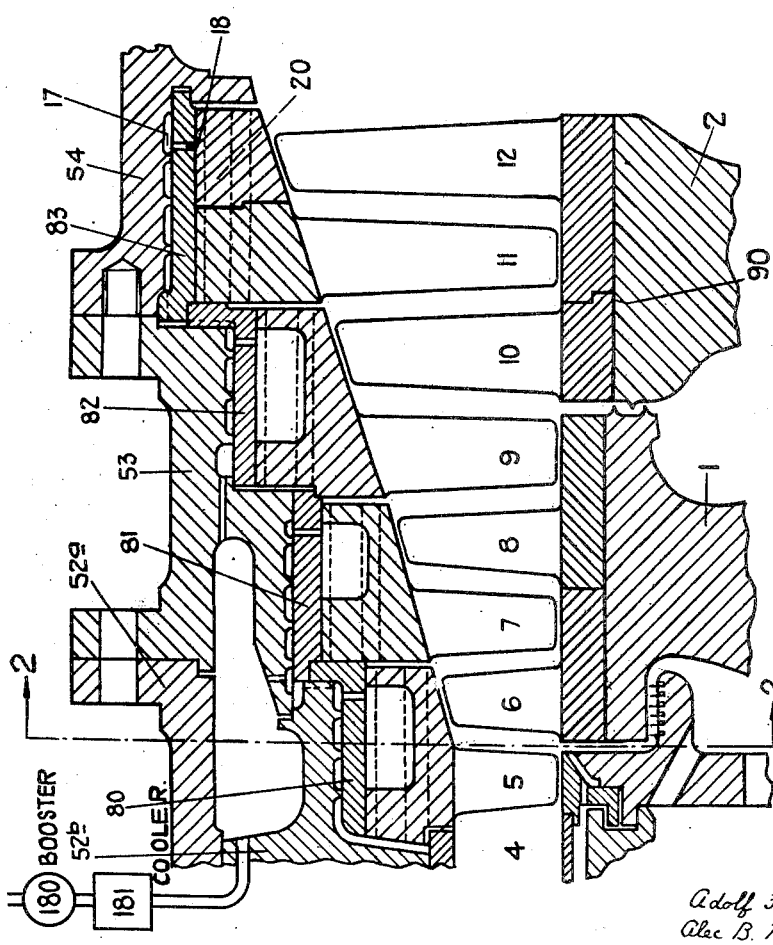
Fig. 1 is a longitudinal part section of the stator and rotor of a gas turbine.

In the present embodiment the stator blades have wedge-shaped roots with a cylindrical bulb portion at the end (Fig. 2) fitting into complementary projections of a blade-retaining ring, 80 for the blades 5, 81 for the blades 7, 82 for the blades 9, and 83 for the blades 11 (Fig. 1).

The stator blade-retaining rings are continuous wherever possible, such as the rings 80 and 82, and circumferentially divided only if this is necessary or convenient for assembly purposes such as the rings 81 and 83 which carry the stator blades 7 and 11, respectively, between the rotor blades 6, 8 and 10, 12, respectively. These stator blade-retaining rings 80—83 are fitted into continuous, circumferentially undivided portions of the stator casing 52b, 53 and 54, and are spigotted into aforesaid portions of the casing and into each other as shown in Fig. 1. It should be noted that particularly rings 81 and 83, which are split and, therefore, may show a tendency for distortion, are held at their ends in suitably arranged unsplit spigots both on their outer and their inner diameters, which arrangement prevents curling in of the aforesaid rings at the split.

The inclined surfaces of the wedge-shaped stator blade roots converge in a line substantially coinciding with the centre line of the cylindrical bulb portion, whereby any relative movement due to temperature differences between the contacting inclined faces of the stator blade roots and of the projections of the stator blade-retaining ring will occur substantially in the plane of the contacting surfaces without causing the formation of gaps between the contacting parts, or excessive bearing pressures across the aforesaid contactor faces.

In order to restrict the path available for heat conduction from the blades to the stator blade-retaining rings, cut-outs 19 and/or bores 20 are arranged in the projections of the stator blade-retaining rings and/or in the stator blade roots. In the present embodiment, cut-outs 19 are shown in the stator blade roots only, and bores 20 in the said projections only, but the arrangement can be reversed, or both cut-outs and bores can be arranged in the stator blade roots as well as in the projections of the stator blade-retaining rings.

Figure 3:
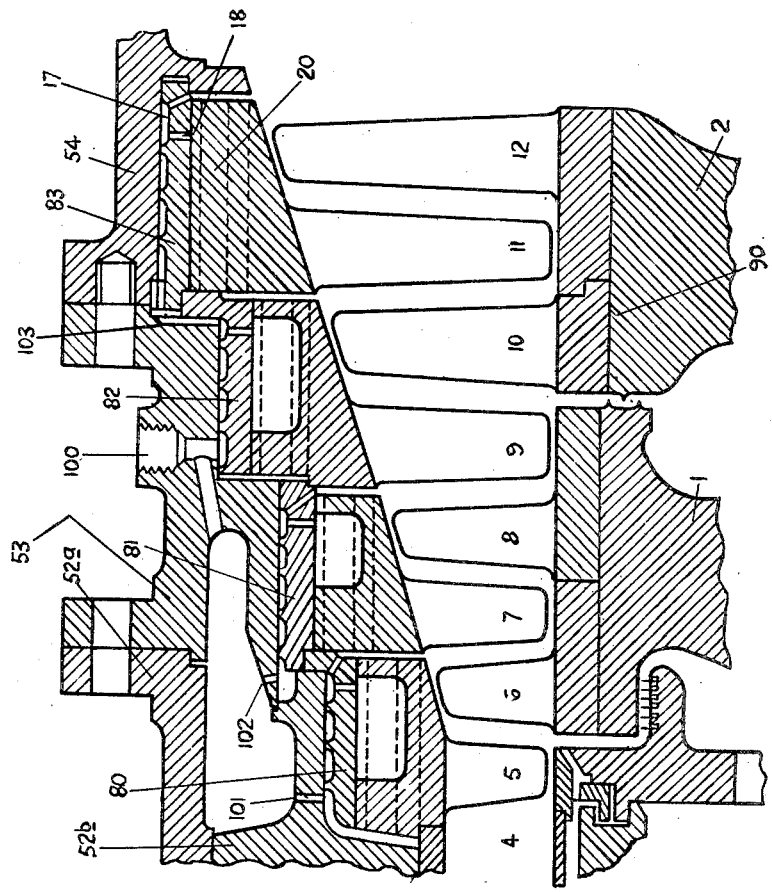
Fig. 3 is a section corresponding to Fig. 1 through a modified embodiment of a gas turbine according to the invention.

The cut-outs 19 and bores 20 may be sealed from the gas stream and filled with stagnant air as a heat insulator. In the present embodiment, however, cooling air at a pressure higher than that prevailing in the gas stream, say at delivery pressure of the compressor supplying the combustion chamber of the gas turbine (not shown), is supplied to helical grooves 17 in the continuous portions 52b, 53, 54 of the stator casing through the air inlet pipe 100 and passages 101, 102 and 103 (Fig. 3). This air prevents the inflow of heat from the blade-retaining rings 80—83 into the portions of the stator casing wherein they are seated and keeps down the temperature of these rings. If compressor delivery pressure is not sufficient to provide the required pressure drop, a booster fan 180 for the tapped-off cooling air can be provided. A cooler 181 for the said air can also be provided if required. The helical ducts can be connected with the supply of the cooling fluid in series, in parallel or in groups partly in series and partly in parallel.

Moreover, the helical grooves 17 may be connected by bores 18 with the cut-outs 19, thus pressurising the cut-outs, which are sealed off at both ends by the blade roots, and making sure that any leakage which may occur in a gap between the blade roots and the blade-retaining rings will be cooling air escaping from, and not to hot gas entering into, the space. Instead of being arranged in the casing, the helical grooves could be provided in the outer circumference of the blade retaining rings (Fig. 3).

By the arrangement according to the invention, thermal expansion is confined substantially to the stator blades proper and to a lesser extent to the blade roots and inward radial projections of the blade-retaining rings, but the temperatures and thermal expansions of the circumferential portions of these rings and particularly the continuous portions of the stator casing are kept within a permissible range by the cooling air flowing between aforesaid continuous portions and the casings.

The pressure energy of the cooling air tapped off from the compressor delivery is partly recovered in the gas turbine stages downstream of the zone where the individual cooling air streams join the main gas stream.

The roots of the stator blades 5, 7, 9 and 11 and of the rotor blades 6 and 8 are extended in an axial direction so as to overhang the tips of the adjacent relatively rotating row of blades.

Rotor blades 10, instead of having a similar axial extension as blades 6 and 8, may abut axially against the extensions of blades 12, to which they are spigotted at 99.

Referring now to Fig. 2, it will be seen that the platforms of the blade roots, both of the stator blades such as 5 and of the rotor blades such as 6, abut peripherally against that of the adjacent lades of the same row. Thereby both the stator ring, such as 80, and the rotor disc, such as 1, are completely screened by the blade roots and their platforms from the hot gas stream moving past at high velocity.

The grooves for the axially inserted rotor blades are preferably of the fir tree root type as shown in Fig. 2 and extend preferably parallel or at an acute angle (say less than 45°) to the axial direction.

What we claim as our invention and desire to secure by Letters Patent is:

1. A gas turbine comprising a plurality of circumferentially undivided rings bolted together axially to form a continuous, rigid, pressure retaining stator casing and helically grooved on their inner surfaces for the flow of a cooling fluid, a plurality of blade retaining rings located on the inner surfaces of said undivided rings and longitudinally grooved on their inner surfaces with profiled grooves, and a plurality of lateral entry type stator blades arranged in annular rows in the said blade retaining rings, each blade being composed of portions integral with one another, namely a root portion profiled to match the said profiled grooves, a platform portion extending circumferentially to abut with the platform portions of the adjacent blades of the same row and extending axially to abut with the platform portions of the blades of an adjacent row and an aerofoil portion arranged for projecting from the said platform portion into the main gas stream of the gas turbine.

2. A gas turbine comprising a plurality of circumferentially undivided rings bolted together axially to form a continuous, rigid, pressure retaining stator casing, a plurality of blade retaining rings located on the inner surface of said undivided rings, helically grooved on their outer surfaces for the flow of a cooling fluid and longitudinally grooved on their inner surfaces with profiled grooves, and a plurality of lateral entry type stator blades arranged in annular rows in the said blade retaining rings, each blade being composed of portions integral with one another, namely a root portion profiled to match the said profiled grooves, a platform portion extending circumferentially to abut with the platform portions of the adjacent blades of the same row and extending axially to abut with the platform portions of the blades of an adjacent row, and an aerofoil portion arranged for projecting from the said platform portion into the main gas stream of the gas turbine.

ADOLF FRANKEL.
ALEC BURTON MITCHELL.

REFERENCES CITED

The following references are of record in the file of this patent:

UNITED STATES PATENTS

| Number | Name | Date |
|---|---|---|
| 1,801,427 | Holzwarth | Apr. 21, 1931 |
| 2,112,391 | Anxionnaz | Mar. 29, 1938 |
| 2,141,401 | Martinka | Dec. 27, 1938 |
| 2,241,782 | Jendrassik | May 13, 1941 |
| 2,243,467 | Jendrassik | May 27, 1941 |
| 2,244,467 | Lysholm | June 3, 1941 |
| 2,272,831 | Chalupa | Feb. 10, 1942 |
| 2,279,258 | Allen | Apr. 7, 1942 |
| 2,357,709 | Truex | Sept. 5, 1944 |
| 2,410,804 | Baumann | Nov. 12, 1946 |
| 2,445,661 | Constant | July 20, 1948 |
| 2,468,461 | Price | Apr. 26, 1949 |
| 2,472,062 | Boestad | June 7, 1949 |
| 2,488,875 | Morley | Nov. 22, 1949 |

FOREIGN PATENTS

| Number | Country | Date |
|---|---|---|
| 579,316 | Great Britain | July 31, 1946 |
| 579,783 | Great Britain | Aug. 15, 1946 |